US009945642B2

(12) United States Patent
Roebroeks et al.

(10) Patent No.: US 9,945,642 B2
(45) Date of Patent: Apr. 17, 2018

(54) BLAST AND FRAGMENT RESISTANT WALL SECTIONS USED INSIDE STRUCTURES LIKE SHIPS

(75) Inventors: Geert Roebroeks, Delft (NL); Erik Peter Carton, Delft (NL); Andre van Erkel, Delft (NL); Rogier van der Wal, Delft (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 183 days.

(21) Appl. No.: 14/128,270

(22) PCT Filed: Jun. 25, 2012

(86) PCT No.: PCT/NL2012/050448
§ 371 (c)(1),
(2), (4) Date: Dec. 20, 2013

(87) PCT Pub. No.: WO2012/177140
PCT Pub. Date: Dec. 27, 2012

(65) Prior Publication Data
US 2014/0116236 A1     May 1, 2014

(30) Foreign Application Priority Data
Jun. 23, 2011   (EP) ..................................... 11171207

(51) Int. Cl.
*F41H 5/04*      (2006.01)
*B32B 15/08*     (2006.01)
(Continued)

(52) U.S. Cl.
CPC ........... *F41H 5/0442* (2013.01); *B32B 15/08* (2013.01); *B32B 15/18* (2013.01); *B32B 15/20* (2013.01);
(Continued)

(58) Field of Classification Search
CPC ... F41H 5/00; F41H 5/02; F41H 5/023; F41H 5/04; F41H 5/045; F41H 5/0457;
(Continued)

(56) References Cited

U.S. PATENT DOCUMENTS 2,474,682 A  *  6/1949  Liebowitz .............. B23K 20/04
                                                        420/119
3,157,090 A  * 11/1964  Ballu .................... F41H 5/0457
                                                        156/701
(Continued)

FOREIGN PATENT DOCUMENTS

GB          122370          1/1919
GB          961217          2/1961
(Continued)

OTHER PUBLICATIONS

Roland et al., Elastomer-steel laminate armor, Composite Structures vol. 92, pp. 1059-1064 (2010).
(Continued)

*Primary Examiner* — Benjamin P Lee
(74) *Attorney, Agent, or Firm* — Hoffmann & Baron, LLP

(57) ABSTRACT

A protective wall for use in a structure such as a ship comprises a first and second metal layer, with an armor plate in between and layers of elastomeric material between the armor plate and the first and second metal layer respectively. The first and second metal layer having a higher ductility than the armor plate, the armor plate being mounted between the first and second metal layer in a way that allows the first and second metal layers to stretch relative to armor steel plate at least in response to forces resulting from impact by fragments from an explosion. When an explosion occurs in a space bounded by the protective wall, the first and second metal layer deflect under the pressure pulses due to blasts, stretching relative to the armor plate. The armor plate blocks high speed fragments. The elastomeric material has a double
(Continued)

function: it increases the resistance of the armor plate to fragments and it allows for separation of the armor plate from the first and second metal layer, allowing them to stretch.

24 Claims, 2 Drawing Sheets

(51) Int. Cl.
| | | |
|---|---|---|
| B32B 15/18 | (2006.01) | |
| B32B 15/20 | (2006.01) | |
| B32B 27/40 | (2006.01) | |
| B63B 3/58 | (2006.01) | |
| B63B 43/00 | (2006.01) | |
| B63G 13/00 | (2006.01) | |
| B63B 3/56 | (2006.01) | |

(52) U.S. Cl.
CPC .............. *B32B 27/40* (2013.01); *B63B 3/58* (2013.01); *B63B 43/00* (2013.01); *B63G 13/00* (2013.01); *F41H 5/0457* (2013.01); *B32B 2250/44* (2013.01); *B32B 2571/02* (2013.01); *B32B 2605/12* (2013.01); *B63B 3/56* (2013.01); *Y10T 29/49885* (2015.01)

(58) Field of Classification Search
CPC . F41H 7/04; F41H 7/042; F41H 7/044; B63B 3/10
USPC .... 89/36.01, 36.02, 36.04, 36.12; 114/9, 10, 114/11, 14
See application file for complete search history.

(56) References Cited

U.S. PATENT DOCUMENTS

| | | | | | |
|---|---|---|---|---|---|
| 4,131,053 | A | * | 12/1978 | Ferguson | F41H 5/0414 109/82 |
| 4,404,889 | A | * | 9/1983 | Miguel | F41H 5/0442 428/118 |
| 4,813,334 | A | * | 3/1989 | Bloks | B32B 15/04 109/82 |
| H001061 | H | * | 6/1992 | Rozner | F41H 5/0457 109/82 |
| 5,290,637 | A | * | 3/1994 | Sliney | 428/548 |
| 5,905,225 | A | * | 5/1999 | Joynt | 89/36.02 |
| 6,216,579 | B1 | * | 4/2001 | Boos | B32B 5/26 89/36.02 |
| 6,706,406 | B1 | | 3/2004 | Kennedy | |
| 7,300,893 | B2 | * | 11/2007 | Barsoum et al. | 442/134 |
| 7,926,407 | B1 | * | 4/2011 | Hallissy | F41H 1/02 109/49.5 |
| 7,930,965 | B2 | * | 4/2011 | Ravid | F41H 5/0464 89/36.02 |
| 8,074,552 | B1 | * | 12/2011 | Imholt | F41H 5/045 89/36.01 |
| 8,336,439 | B2 | * | 12/2012 | St. Claire | F41H 5/0457 89/36.02 |
| 8,746,122 | B1 | * | 6/2014 | Roland | F41H 5/04 89/36.02 |
| 2004/0035076 | A1 | | 2/2004 | Schilt | |
| 2006/0266207 | A1 | * | 11/2006 | Cerny | F41H 5/045 89/36.02 |
| 2007/0111621 | A1 | | 5/2007 | Barsoum et al. | |
| 2008/0223203 | A1 | | 9/2008 | Ravid et al. | |
| 2010/0163685 | A1 | * | 7/2010 | Vormezeele | B64C 9/22 244/214 |
| 2010/0212486 | A1 | * | 8/2010 | Kurtz | F41H 5/0457 89/36.02 |
| 2010/0282062 | A1 | * | 11/2010 | Sane et al. | 89/36.02 |
| 2011/0072960 | A1 | * | 3/2011 | Hallissy et al. | 89/36.02 |
| 2011/0120293 | A1 | * | 5/2011 | Venton-Walters et al. | 89/36.02 |
| 2011/0162515 | A1 | * | 7/2011 | St. Claire | F41H 5/0457 89/36.02 |
| 2012/0017754 | A1 | * | 1/2012 | Joynt | F41H 5/007 89/36.02 |
| 2012/0174754 | A1 | * | 7/2012 | Salisbury | B32B 9/005 89/36.02 |
| 2012/0180630 | A1 | * | 7/2012 | Chu | F41H 5/045 89/36.02 |
| 2012/0291615 | A1 | * | 11/2012 | Tatarliov | F41H 5/0464 89/36.02 |
| 2013/0087662 | A1 | * | 4/2013 | Soenarjo | B64C 9/16 244/215 |
| 2014/0059826 | A1 | * | 3/2014 | Schlipf | B64C 1/14 29/426.1 |

FOREIGN PATENT DOCUMENTS

| | | |
|---|---|---|
| WO | 9958333 A1 | 11/1999 |
| WO | 02068186 A1 | 9/2002 |
| WO | 2005051649 A1 | 6/2005 |

OTHER PUBLICATIONS

Galle et al., "TNO-PML Developments of Blast Resistant Structures for the Royal Netherlands Navy", SAVAIC, 71st Shock & Vibration Symposium, pp. 1-14; 2000.
Van Erkel et al., "TNO-PML Developments of Blast Resistant Doors and Walls", 1st European Survivability Workshop, pp. 1-15; 2002.

* cited by examiner

US 9,945,642 B2

BLAST AND FRAGMENT RESISTANT WALL SECTIONS USED INSIDE STRUCTURES LIKE SHIPS

This application is the U.S. National Phase of, and Applicants claim priority from, International Patent Application Number PCT/NL2012/050448 filed 25 Jun. 2012, which claims priority from EP 11171207.1 filed 23 Jun. 2011, each of which is incorporated herein by reference.

FIELD OF THE INVENTION

The invention relates to blast and fragment resistant wall sections used inside structures like vehicles such as ships.

BACKGROUND

U.S. Pat. No. 6,706,406 discloses a ship hull design with hull plates formed from a pair of parallel ductile steel layers with an elastomer bonded to the steel layers in the space between the two layers. Voids may be provided in the elastomer, filled with rigid foam or light gauge steel. The elastomer arrests the development of cracks, which reduces hull damage during grounding or collisions.

When a ship is hit by an explosive projectile, the most noxious damage is due to the effect of explosion within the ship. The explosion leads to a pressure surge and high velocity fragments that can kill ship's personnel and create extensive damage to the ship's infrastructure.

One possible solution to the high velocity fragments problem is the use of armored bulkheads. Various technologies for manufacturing armored plates are known from the field of armored vehicles, such as use of hard grade steel, ceramics, fabrics of strong fibers or composites thereof. For example, an armor plate comprising a hard armor plate with an elastomer coating on the outside is known from an article titled "Elastomer-steel laminate armor", by C. M. Roland et al., published in Composite structures, 92 pages 1059-1064. By coating the plate, a layer is formed that has no rigidity of its own, but is attached everywhere to the armor plate, so that it stretches everywhere together with the armor plate. The coating serves to increase penetration resistance. Roland et al note that the origin of blast and ballistic mitigation remains to be fully understood, but they mention energy absorption by rubber and strain delocalization Roland et al note that a multi laminate structure may be used, which can be extended to using multiple layers may be introduced into the coating. Roland et al give examples of very thin layers in the coating like 0.25 mm aluminum and 0.33 thick low modulus PU-1. With such an thin aluminum layer in the coating, the coating attaches the aluminum layer everywhere to the armor plate.

However, many of these technologies are unattractive for use in ships, in view of the vast number of plates required in ships, which leads to concerns about weight and costs. This further means that it is desirable that the protective plates as much as possible perform structural functions in the ship, which may conflict with the behavior of conventional armor. For example hard materials are often brittle, and hence vulnerable to pressure surge. Moreover, it may be difficult to weld armor plates to other structures in a way that the welds support a structural function in a reliable way.

SUMMARY

Among others, it is an object to provide for improved blast and fragment protection in ships.

According to one aspect a protective wall for use in a structure such as a ship is provided, the protective wall comprising
a first metal layer,
an armor plate adjacent the metal layer, the first metal layer having a higher ductility than the armor plate, the armor plate being mounted in a way that allows the first metal layer to stretch relative to armor plate at least in response to forces resulting from the pressure surge from an explosion;
a layer of elastomeric material between the armor plate and the first metal layer.

When an explosion occurs in a space bounded by the protective wall, the first metal layer flexes under the pressure pulses due to blasts, stretching relative to the armor plate. The armor plate blocks high speed fragments. The elastomeric material has a double function: it increases the resistance of the armor plate to fragments and it allows the armor plate to be kept in position relative to the first and second metal layer under normal circumstances, without causing significant load transfer from the layers to the armor plate during blast or impact loading. The elastomeric material need not fill the entire space between the armor plate and the first metal layer.

In an embodiment, the wall comprises a second metal layer, the armor plate being located between the first and second metal layer, the first and second metal layer having a higher ductility than the armor plate, the armor plate being mounted between the first and second metal layer in a way that allows the first and second metal layers to stretch relative to armor steel plate at least in response to forces resulting from impact by pressure surge from an explosion; the protective wall comprising layers of elastomeric material between the armor plate and the first and second metal layer respectively. Thus, the wall provides protection in spaces on either side of the wall against explosions on the other side of the wall. The elastomeric material need not fill the entire space between the armor plate and the metal layers.

The first and second metal layer may be fixed parts of the structure, which may be a ship or a land vehicle for example, the first and second metal layer taking up at least part of the normal operational forces that arise due to use of the structure. The wall may be a bulkhead of a ship for example.

In an embodiment the protective wall comprises a plurality of layers of armor plate and layers of elastomeric material. This increases protection against fragments.

BRIEF DESCRIPTION OF THE DRAWING

These and other objects and advantageous embodiments will become apparent from a description of exemplary embodiments using the following figures.

DETAILED DESCRIPTION OF EXEMPLARY EMBODIMENTS

Figure 1:
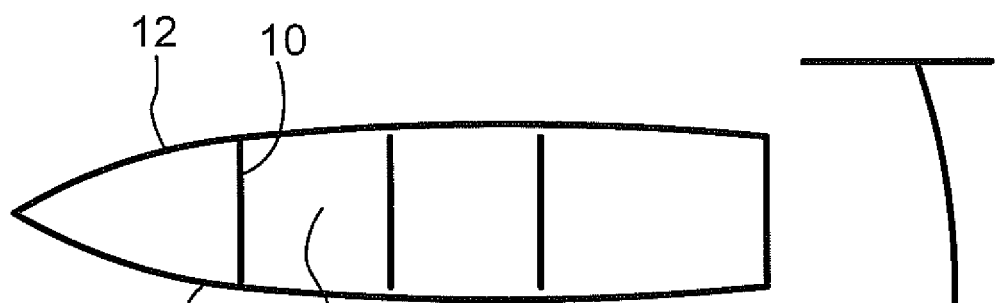
FIG. 1 shows the position of a bulkhead in a ship

FIG. 1 shows the position of a bulkhead 10 in a ship, between two longitudinal wall sections 12, which may be hull sections. The plane of bulkhead 10 extends perpendicularly to the keel line of the ship. Bulkhead 10 is designed to provide for protection in a space 14 adjacent bulkhead 10 on one side of bulkhead 10 against the effects of the explosion of a projectile with high explosive within the ship on the other side of bulkhead 10.

Figure 2:
FIG. 2 illustrates a response of the bulkhead to an explosion

FIG. 2 illustrates the desired effect of the pressure surge associated with such an explosion: bulkhead 10 flexes from the side A on which the explosion occurs to the other side B, absorbing explosive energy in the form of stretching energy.

Figure 3:
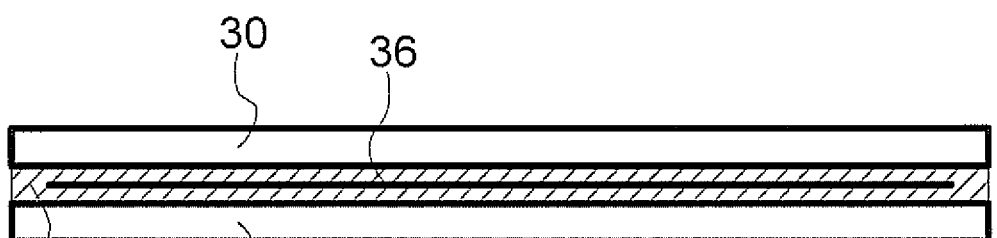
FIG. 3 shows a cross-section of a bulkhead

FIG. 3 shows a cross-section of bulkhead 10. Bulkhead 10 comprises a pair of ductile metal layers 30, 32 with elastomeric material 34 between ductile metal layers 30, 32 and an armor steel plate 36 "floating" between ductile metal layers 30, 32. As used herein, "floating" means that the coupling between armor steel plate 36 and ductile metal layers 30, 32 allows ductile metal layers 30, 32 to stretch independently of armor steel plate 36 under influence of forces with force amplitudes as induced by explosions. A floating presence may be realized by the absence of a direct fixed attachment of armor steel plate 36 to ductile metal layers 30, 32, or at least by a limitation of direct fixed attachment to a point or line. A floating presence of armor steel plate 36 may be realized when substantially all contact between armor steel plate 36 and ductile metal layers 30, 32 is mediated via elastomeric material 34. A floating armor steel plate 36 may rest on a rib of a ductile metal layer 30, 32 for example, without being fixedly attached to the rib. As used herein, fixedly attached includes attachment by welding, rivets, bolts etc. that resist forces that arise during explosions, whereas not fixedly attached includes contacts that allow for relative sliding motion at least when exposed to forces that arise during explosions. Spot welds or small bolts (e.g. M3 bolts or less) may be used Ductile metal layers 30, 32 may be made of steel of a known standard ship building steel quality, for example of steel types Steel 37 or Steel 52 (as is well known the standards for Steel 37 etc, specify the material properties and many manufacturers supply steel that meets these specifications; in the more modern EN 10028-3 standard Steel 37 and Steel 52 are also known as S235 and P355 respectively, but the terms Steel 37 and Steel 52 are still well known to skilled persons in the ship building industry).

Steel 37 and Steel 52 have a limited tensile strength (plates fail at engineering stress of less than 550 MPa and hence also less than 600 MPa) and a large deformability (more than 25% engineering strain (elongation) before rupture). Standard measurements for measuring tensile strength are known per se. The strength of a material is expressed in terms of the stress at which the material fails. This involves subjecting a piece of material to a tensile force, the force defining a tensile stress on the piece as the force divided by the cross-sectional area of the piece in a plane perpendicular to the direction of the force. The strength is the maximum stress that the material is able to resist, i.e. the stress reached before the piece of material fails e.g. by necking. Because no high demands are placed on this strength, other building materials such as aluminum or titanium may also be considered. Similar performance can be achieved when the outer ductile steel layers are replaced with ductile metals such as aluminium and titanium. This may be applied to land vehicles requiring a similar combination of blast and fragment resistance. Ductile metal layers 30, 32 may have a thickness between 1-15 millimeter, and preferably between 4-7 millimeter. The material of armor steel plate 36 may be of material with the yield stress and tensile strength of known commercially available ARMOX 500 or ARMOX 600 for example. Such materials have a strength to resist at least 1000 MPa and up to 2500 MPa local tensile stress, which may be realized for example by metallurgical techniques such as adding carbon processing the steel to increase internal stresses. Armor steel plate 36 may have a thickness between 5-15 millimeter or, more narrowly, between 1-10 millimeter. The overall thickness of bulkhead 10 may be in the range of 5-150 millimeter and preferably between 60-120 millimeter. Various types of elastomeric materials may be used, for example one of the types described in the article by C. M. Roland et al. cited in the preceding. A rubber layer may be used for example.

Figure 4:
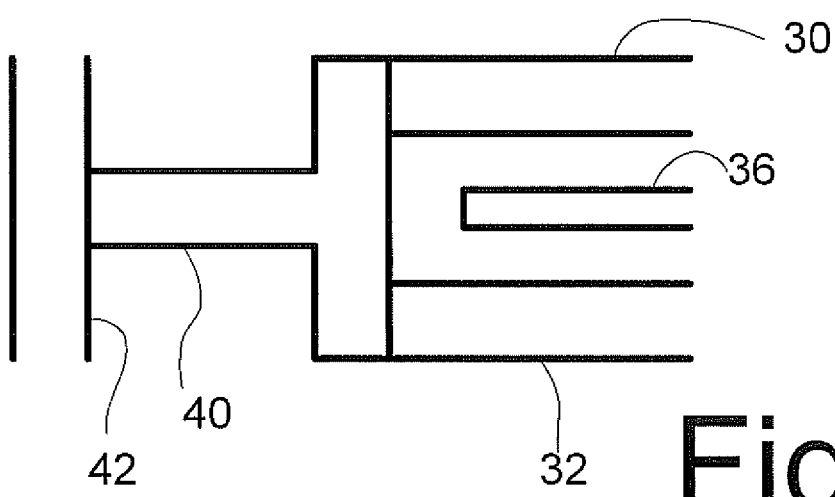
FIG. 4 shows a detail of an attachment of the bulkhead

FIG. 4 shows a cross-section of a detail of an attachment of bulkhead 10 to a structural element 42 of the ship, such as a longitudinal wall section 12, a girder in longitudinal wall section 12 or similar structural elements such as a ceiling or floor (or decks) or girders in the ceiling or floor. More generally, a structural element is any elements of the ship's structure that mediates forces that keep the ship from deforming or falling apart during normal operation. Structural element 42 may be made of ductile steel, of a material similar to that of ductile metal layers 30, 32. The attachment comprises a connection piece 40 with a T-shaped cross-section, which may be of the same material as ductile metal layers 30, 32. The foot of the T of connection piece 40 is welded to structural element 42. In an embodiment wherein bulkhead 10 has an elongated shape, at least the parallel pair of sides of bulkhead 10 that are closest to each other are attached to the structure of the ship are attached according to this T profile. In an embodiment the top of the T may be an insert plate with a thickness that is necessarily larger than the sum of the thickness of layers 30 and 32. For example when the floor to ceiling distance is smaller than the wall to wall distance, the T may be attached to the floor and ceiling. This prevents excessive deformation during explosions. Ductile metal layers 30, 32 are welded to the top bar of the T connection piece 40, at a single or few points only for positioning, in a manner not suitable for significant load transfer. Preferably, armor steel plate 36 is only coupled to connection piece 30 via elastomeric material 34. Armor steel plate 36 is not fixedly attached directly to connection piece 40, or at most at a single point.

Bulkhead 10 may be assembled in situ when the ship is built. In embodiment ductile metal layers 30, 32 are first welded to a structural element 42 via connections pieces 40, leaving a space between the layers. Elastomeric material 34 is applied to armor steel plate 36 (this may be done at a prefab stage) and the armor steel plate 36 with applied elastomeric material 34 is inserted between the ductile metal layers 30, 32 that have been welded into the ship's structure. In this way heat damage to elastomeric material 34 during welding can be avoided.

In another embodiment, one of the ductile metal layers 30 is first attached to a connection piece like that of FIG. 4, for example by welding. Next armor steel plate 36 or a plurality of such plates 36 is or are placed, for example on supporting ridges on the ductile metal layer 30. Armor steel plate 36 may be placed between stiffeners on ductile metal layer 30 for example. A layer of armor steel plate 36 may be constructed in situ from a series of strips of armor steel plate 36. Subsequently, the other ductile metal layer 32 is attached to the connection piece, for example by welding.

In a further embodiment the other ductile metal layer 32 is formed from a series of strips that are each welded to the connection piece and/or to stiffeners on the first attached ductile metal layer 30. In these embodiments a prefab armor steel plate 36 may be used, which is provided with elastomeric material 34. Alternatively, the elastomeric material 34 may be added during assembly as well. The connection piece may subsequently be welded to the ship's structure, or this may be done at an earlier stage, e.g. before the first ductile metal layer 30 is attached to the connection piece.

In operation, bulkhead 10 combines the effect of the deformability of ductile metal layers 30, 32 on protection against pressure pulses with fragment protection by armor steel plate 36. When a fragment hits bulkhead, it will typically penetrate one of ductile metal layers 30, 32 and cause armor steel plate 36 to exhibit "plugging", i.e. local shearing through the thickness. Because armor steel plate 36 "floats" between ductile metal layers 30, 32, its inhibiting effect on deformation of ductile metal layers 30, 32 during pressure pulses is reduced. Elastomeric material 34 makes it possible to mount armor steel plate 36 between ductile metal layers 30, 32 with a minimal effect on the deformability. Alternatively, armor steel plate 36 may be kept in place by means of local stiffeners, such as ribs on ductile metal layers 30, 32 (not shown), without being directly fixedly attached to these stiffeners. In addition elastomeric material 34 increases the resistance of armor steel plate 36 against explosion propelled fragments. Part of this may be due to reduction of notch effect on armour steel plate 36 by fragments, reducing the otherwise predominant failure mechanism through thickness shearing.

Figure 5:
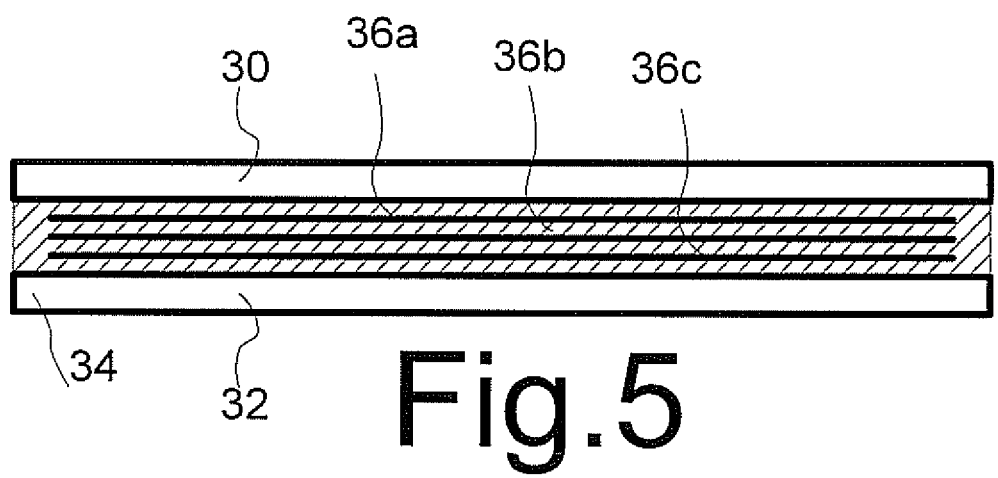
FIG. 5 shows a cross-section of a further bulkhead

FIG. 5 shows a cross-section of a further bulkhead, with a plurality of layers of armor steel plates 36*a-c* between ductile metal layers 30, 32 with elastomeric material 34 between ductile metal layers 30, 32 and armor steel plates 36*a-c* and between the layers of armor steel plates 36*a-c*. By splitting armor steel plate 36 of the embodiment of FIG. 3 into multiple layers with intermediate elastomeric material a higher protection can be realized at the same or lower weight.

Armor steel plate 36 of the embodiment of FIG. 3 or each layer of armor steel plates 36*a-c* of the embodiment of FIG. 5 may be provided in the form of a plurality of strips parallel to the main plane of bulkhead 10 and separated by elastomeric material. In this way a better deformability may be realized. The strips in different layers of armor steel plates 36*a-c* may be offset relative to each other, so that spaces between strips in one layer are backed up by strips in the other. Horizontal or vertical strips may be used. A plurality of strips may be used over the height or width of the wall. As used herein, "strips" may be elongated rectangular elements, but the term strip cover any shape and height/width ratio.

In an experiment a wall of 6 millimeter thick ductile metal layers 30, 32 of Steel 52, and a double ARMOX-600T double sheet of armor steel 36 was made, with volume between the ductile metal layers 30, 32 and armor steel 36 filled with polyurethane rubber adhered to armor steel 36. Fragments Simulating Projectiles (known in the art as FSP's) with a mass of 39 grams were fired at the wall with a 29 millimeter canon with speeds up to 1850 m/sec to simulate fragments. Up to this speed penetrations of the wall could not be obtained. At 1831 m/sec the first ductile layer was penetrated. The sheets of ARMOX were dented and cracked but the cracks opened insufficiently to allow remains of the projectile to pass through. The back ductile layer was only deformed.

This compared favorably with experiments with a wall of 20 millimeter Steel 52, which was penetrated at speeds higher than 1096 m/sec. A combination of two walls of 10 millimeter Steel 52 at 32 mm spacing, was penetrated at speeds higher than 1512 m/sec. A combination of 6 mm Steel 52-7 mm Armox600T 6 mm Steel 52, with 9 and 16 mm spacing was penetrated at speeds higher than 1196 m/sec.

Although embodiments have been described wherein ductile metal layers 30, 32 are provided on both sides of armor steel 36, it should be appreciated that in other embodiments a ductile metal layer on one side may be omitted. This may means that less protection is provided against fragments from the side where no ductile metal layer is present. But this may not be needed when this space itself is protected against projectiles, or contains other means to slow down fragments.

In an embodiment the structure is assembled by attaching a first metal layer to a connection piece, mounting an armor plate coated on both sides with elastomeric material between on the first metal layer attached to the connection piece, attaching a second metal layer to the connection piece and/or the first metal layer and over the armor plate, the first and second metal layer having a higher ductility than the armor plate. This makes it possible to assemble the wall easily within a ship for example.

In another embodiment structure is assembled by at least part of the structure with a wall comprising a first and second metal layer attached to elements of the structure, and inserting an armor plate coated on both sides with elastomeric material between the first and second metal layer, the first and second metal layer having a higher ductility than the armor plate. This makes it possible to assemble the wall on site.

The invention claimed is:

1. A protective wall for use in a structure such as a ship, the protective wall comprising:
 a first metal layer extending in a first plane between a first end and a second end;
 a second metal layer extending between a first end and a second end in a second plane that is parallel to said first plane;
 an armor steel plate, the armor steel plate being located between the first and second metal layers, the first and second metal layers having a higher ductility than the armor steel plate, the armor steel plate being mounted in a way that allows the first and second metal layers to stretch relative to said armor steel plate at least in response to forces resulting from a pressure surge from an explosion;
 a first layer and a second layer of elastomeric material between the armor steel plate and the first and second metal layers, respectively; and
 a connection piece, wherein the first end of the first metal layer is directly connected to the connection piece, the first end of the second metal layer is directly connected to the connection piece and the armor steel plate does not contact the connection piece.

2. The protective wall according to claim 1, comprising a plurality of layers of armor steel plate successively between first and second metal layers, the layers of elastomeric material lying between the layers of armor steel plate and between the layers of armor steel plate and the first and second metal layers respectively.

3. The protective wall according to claim 1, wherein first and second metal layers are made of steel, titanium or aluminum.

4. The protective wall according to claim 1, wherein the armor steel plate has a yield stress and tensile strength corresponding to ARMOX 500 or ARMOX 600.

5. The protective wall according to claim 1, wherein the first and second metal layers each have a tensile strength of less than 600 MPa and the armor steel plate has a tensile strength of more than 1000 MPa.

6. The structure according to claim 1, wherein the connection piece has first and second faces, and wherein the first ends of each of the first and second metal layers are attached to the first face, and the second face is attached to a wall, ceiling or floor element of the structure.

7. The structure according to claim 6, wherein the wall is a bulkhead of a ship.

8. The protective wall according to claim 1, wherein substantially all contact between the armor steel plate and the metal layer is mediated via the layer of elastomeric material.

9. The protective wall according to claim 1, wherein there is no direct fixed attachment between the armor steel plate and the first and second metal layers.

10. A protective wall according to claim 1, wherein the connection piece has a T-shaped cross-section and comprises a top bar and an elongated member extending from the top bar to a distal end, wherein the first end of each of the first and second metal layers is connected to the top bar of the connection piece and the distal end of the elongated member of the connection piece is attached to the structure.

11. The protective wall according to claim 1, wherein the armor steel plate is only coupled to the connection piece via the elastomeric material.

12. A method of assembling a structure, comprising:
attaching a first end of a first metal layer directly to a connection piece, the first metal layer extending in a plane from the first end to a second end,
placing an armor steel plate coated on both sides with elastomeric material adjacent to the first metal layer, after the first metal layer is attached to the connection piece, without attaching the armor steel plate directly to the connection piece, whereby the first metal layer is allowed to stretch relative to the armor steel plate in said plane at least in response to forces resulting from a pressure surge from an explosion, and
attaching a second metal layer directly to the connection piece and/or the first metal layer and over the armor steel plate, the first and second metal layers having a higher ductility than the armor steel plate.

13. A method of assembling a structure comprising assembling at least part of the structure with a wall, the wall comprising:
first and second metal layers each having first and second ends and extending, respectively, in first and second parallel planes and each of the first and second ends attached to elements of the structure, and
inserting an armor steel plate coated on both sides with elastomeric material between the first and second metal layers after each of the first and second ends of said first and second metal layers are attached directly to elements of the structure without attaching the armor steel plate directly to said elements,
whereby the first and second metal layers are allowed to stretch relative to the armor steel plate in said first and second planes, respectively, at least in response to forces resulting from a pressure surge from an explosion, the first and second metal layers having a higher ductility than the armor steel plate.

14. A protective wall for use in a structure such as a ship, the protective wall comprising:
a first metal layer extending in a first plane and having a surface and one or more ribs on the s surface;
an armor steel plate adjacent the first metal layer, the first metal layer having a higher ductility than the armor steel plate, the armor steel plate being mounted in a way that allows the first metal layer to stretch relative to said armor steel plate at least in response to forces resulting from a pressure surge from an explosion; and
a first layer of elastomeric material between the armor steel plate and the first metal layer,
wherein the armor steel plate rests on at least one of the one or more ribs on the surface of the first metal layer, without being fixedly attached to the rib(s).

15. The protective wall according to claim 14 further comprising:
a second metal layer extending in a second plane that is parallel to said first plane and having a surface and one or more ribs on the surface; and
a second layer of elastomeric material between the armor steel plate and the second metal layer,
wherein the armor steel plate rests on at least one of the one or more ribs on the surface of the second metal layer, without being fixedly attached to the rib(s), wherein the first and second metal layers have a higher ductility than the armor steel plate, and wherein the armor steel plate is disposed between the first and second metal layers in a way that allows the first and second metal layers to stretch relative to said armor steel plate in said first and second planes, respectively, at least in response to forces resulting from impact by fragments from an explosion.

16. The protective wall according to claim 15 comprising a plurality of layers of armor steel plate successively disposed between first and second metal layers, the layers of elastomeric material lying between the layers of armor steel plate and between the layers of armor steel plate and the first and second metal layers, respectively.

17. The protective wall according to claim 15, wherein first and second metal layers are made of steel, titanium or aluminum.

18. The protective wall according to claim 15, wherein the first and second metal layers each have a tensile strength of less than 600 MPa and the armor steel plate has a tensile strength of more than 1000 MPa.

19. The protective wall according to claim 14, wherein the armor steel plate has a yield stress and tensile strength corresponding to ARMOX 500 or ARMOX 600.

20. The structure according to claim 14, comprising a connection piece with first and second faces, the first and second metal layers being attached to the first face, the second face being attached to a wall, ceiling or floor element of the structure.

21. The structure according to claim 20, wherein the wall is a bulkhead of a ship.

22. The protective wall according to claim 14, wherein substantially all contact between the armor steel plate and the metal layer is mediated via the layer of elastomeric material.

23. The protective wall according to claim 14, further comprising:
a second metal layer extending in a second plane that is parallel to said first plane and having a surface and one or more ribs on the surface, the second metal layer having a higher ductility than the armor steel plate, the armor steel plate being located between the first and second metal layers; and
a further layer of elastomeric material between the second metal layer and the armor steel plate,
wherein the armor steel plate rests on at least one of the one or more ribs on the surface of the second metal layer, without being fixedly attached to the rib(s).

24. The protective wall according to claim 14 further comprising:

a second metal layer extending in a second plane that is parallel to said first plane and having a surface and one or more ribs on the surface, the second metal layer having a higher ductility than the armor steel plate, the armor steel plate disposed between the first and second metal layers, wherein the armor steel plate rests on at least one of the one or more ribs on the surface of the second metal layer, without being fixedly attached to the rib(s); and a further layer of elastomeric material between the second metal layer and the armor steel plate, wherein there is no direct fixed attachment between the armor steel plate and the first and second metal layers.

* * * * *